United States Patent
Jeon

(10) Patent No.: US 7,471,965 B2
(45) Date of Patent: Dec. 30, 2008

(54) MOBILE TERMINAL HAVING A HEAT RELEASING MEMBER

(75) Inventor: Hwan-Jun Jeon, Gyeonggi-Do (KR)

(73) Assignee: LG Electronics Inc., Seoul (KR)

(*) Notice: Subject to any disclaimer, the term of this patent is extended or adjusted under 35 U.S.C. 154(b) by 242 days.

(21) Appl. No.: 10/893,992

(22) Filed: Jul. 20, 2004

(65) Prior Publication Data

US 2005/0136967 A1 Jun. 23, 2005

(30) Foreign Application Priority Data

Dec. 18, 2003 (KR) .................. 10-2003-0093388

(51) Int. Cl.
 *H04M 1/00* (2006.01)
 *H01L 23/26* (2006.01)
 *H01G 2/08* (2006.01)

(52) U.S. Cl. .................. 455/575.1; 455/550.1; 455/347; 455/575.8; 455/90.3; 174/16.3; 174/17 R; 361/274.3; 361/697; 361/702; 361/709; 361/514

(58) Field of Classification Search .............. 455/550.1, 455/574, 566, 344, 347, 575.3, 575.8, 90.3, 455/575.1
See application file for complete search history.

(56) References Cited

U.S. PATENT DOCUMENTS

| | | | | |
|---|---|---|---|---|
| 5,403,973 A | * | 4/1995 | Santilli et al. | 174/15.1 |
| 5,588,041 A | * | 12/1996 | Meyer et al. | 455/569.2 |
| 6,073,034 A | * | 6/2000 | Jacobsen et al. | 455/566 |
| 6,094,349 A | * | 7/2000 | Fassel et al. | 361/704 |
| 6,164,368 A | * | 12/2000 | Furukawa et al. | 165/104.33 |
| 6,550,927 B1 | * | 4/2003 | Messel | 362/24 |
| 6,904,300 B1 | * | 6/2005 | Maattanen et al. | 455/575.1 |
| 2002/0168948 A1 | * | 11/2002 | Watanabe | 455/90 |
| 2004/0055862 A1 | * | 3/2004 | Nam | 200/512 |
| 2004/0203412 A1 | * | 10/2004 | Greco et al. | 455/66.1 |

* cited by examiner

*Primary Examiner*—Duc Nguyen
*Assistant Examiner*—Huy Q Phan
(74) *Attorney, Agent, or Firm*—KED & Associates, LLP

(57) ABSTRACT

A mobile terminal is provided that may conduct heat generated from a print circuit board when a mobile terminal is in operation to a wider area by use of a heat releasing member having excellent conductivity. This may release unpleasantness that a user feels when using the terminal by lowering a temperature of a key pad. The mobile terminal may include a main body including a plurality of key pads for receiving information from a user; a print circuit board mounted in the main body; a battery provided at the main body; a folder coupled to the main body; a display provided at the folder for displaying a text and other image information; a speaker unit provided at the folder; a microphone unit provided at the main body; and a heat releasing member for releasing heat generated from the print circuit board.

29 Claims, 6 Drawing Sheets

MOBILE TERMINAL HAVING A HEAT RELEASING MEMBER

The present application claims priority from Korean Patent Application No. 93388/2003, filed Dec. 18, 2003, the subject matter of which is incorporated herein by reference.

BACKGROUND OF THE INVENTION

1. Field of the Invention

Embodiments of the present invention may relate to a mobile terminal. More particularly, embodiments of the present invention may relate to a mobile terminal that may reduce unpleasantness to a user and performance deterioration for a component by reducing a temperature of a mobile terminal using a heat releasing member having good heat conductivity to thereby evenly distribute heat to the entire mobile terminal and release heat generated in the terminal to the outside of the terminal.

2. Background of Related Art

A mobile terminal is a communication device by which a user can communicate with another party while conveniently carrying the mobile terminal. A mobile terminal may have an image information receiving/transmitting function as well as a voice receiving/transmitting function.

FIG. 1 is a disassembled perspective view showing a mobile terminal according to an example arrangement. Other arrangements are also possible. As shown, the mobile terminal may include a main body 1 and a folder 2 that are hinge-coupled together to be opened and closed. The folder 2 includes a display 3 for displaying a text and other image information and a speaker unit 11 for providing voice information.

The main body 1 may include a side key 9 installed at a side surface, for inputting a tone or other information during conversation. A battery 4 may be mounted at a rear surface of the mobile terminal to supply electric energy. An upper cover 5 may have a plurality of exposure pad holes 5a so that key pads 8 for inputting numbers, text information or the like may be inserted into the exposure holes 5a and exposed to the outside. A lower cover 6 may be coupled to the upper cover 5 and form a space in which various components can be mounted. A print circuit board 7 may be installed in the space formed by the upper cover 5 and the lower cover 6. The printed circuit board 7 may include mounted components for processing input/output information. A dome sheet 10 may also be installed in the space at an upper surface of the print circuit board 7. The dome sheet 10 may have domes 13 made of a metal material for transmitting information inputted through the key pads 8 to the print circuit board 7.

With the mobile terminal described above, in receiving/transmitting information or using its various functions (such as games or the like), a user may open the folder 2 and press one of the key pads 8 with a finger to input information.

The folder 2 may have various forms. For example, besides the folder 2 being hinge-coupled, the folder 2 may also slide upward and downward or rotate.

If a component of the print circuit board 7 is operated by inputting information of a user or a signal received from the main body 1, then heat may inevitably be generated due to collision of electrons caused by operation of the component. For example, a large amount of heat may be generated from a Mobile Station Modem (MSM), an amplifier or the like. Heat conduction may occur to the key pads 8 and the upper cover 5 through the dome sheet 10. Since only dome portions of the dome sheet 10 are made of a metal material, and remaining portions of the dome sheet 10 are made of a synthetic resin material (i.e., non-metal), then heat conductivity may be low at portions that are not made of a metal material. Accordingly, the heat cannot evenly spread throughout but may be concentrically transmitted to a specific portion thereby forming a hot area where a temperature on the keypad 8 and the upper cover 5 is highest. When the mobile terminal is in a shadow area, the transmission power of the mobile terminal may increase in order to react upon a weak signal, thereby increasing a temperature of the print circuit board 7. Thus, when a user touches the mobile terminal, the user may feel the heat, and the keypad portion coming in contact with a cheek of the user may cause unpleasantness. Furthermore, a life span and performance of components of the print circuit board 7 may deteriorate due to the heat.

SUMMARY OF THE INVENTION

Embodiments of the present invention may provide a mobile terminal capable of conducting heat generated from a print circuit board when a mobile terminal is in operation to a wider area by use of a heat releasing member having excellent conductivity. This may reduce the unpleasantness that a user feels when using the terminal since the temperature of a key pad may be lowered.

A mobile terminal may be provided that includes a main body including a plurality of key pads for receiving information from a user, a print circuit board mounted in the main body, a battery provided at the main body, a folder coupled to the main body, a display provided at the folder for displaying text and other image information, a speaker unit provided at the folder, a microphone unit provided at the main body, and a heat releasing member for releasing heat generated from the print circuit board.

The foregoing and other objects, features, aspects, advantages and embodiments of the present invention may become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a unit of this specification, illustrate arrangements and embodiments of the invention and together with the description serve to explain the principles of the invention.

The following represent brief descriptions of the drawings in which like reference numerals represent like elements and wherein.

DETAILED DESCRIPTION OF PREFERRED EMBODIMENTS

Figure 1:
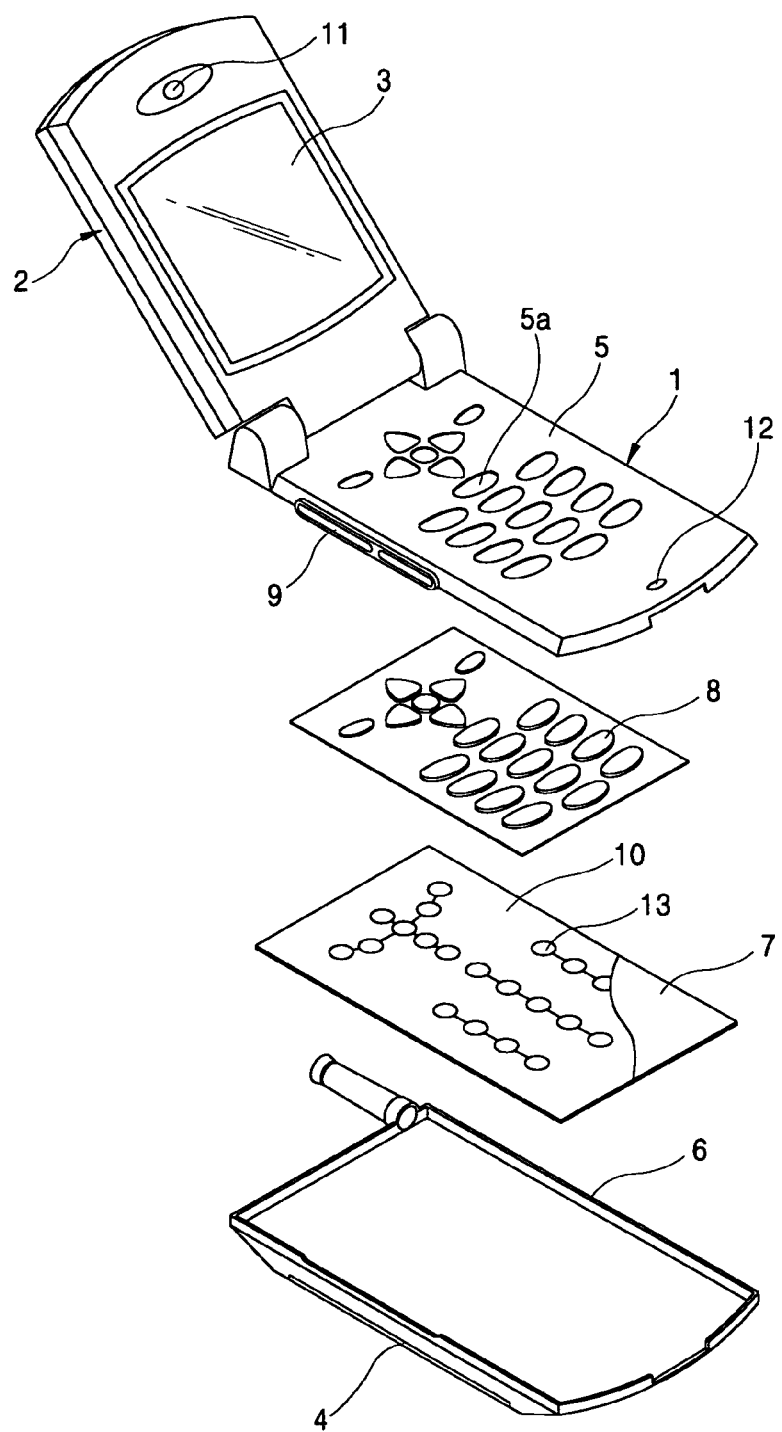
FIG. 1 is a disassembled perspective view of a mobile terminal according to an example arrangement.
Figure 2:
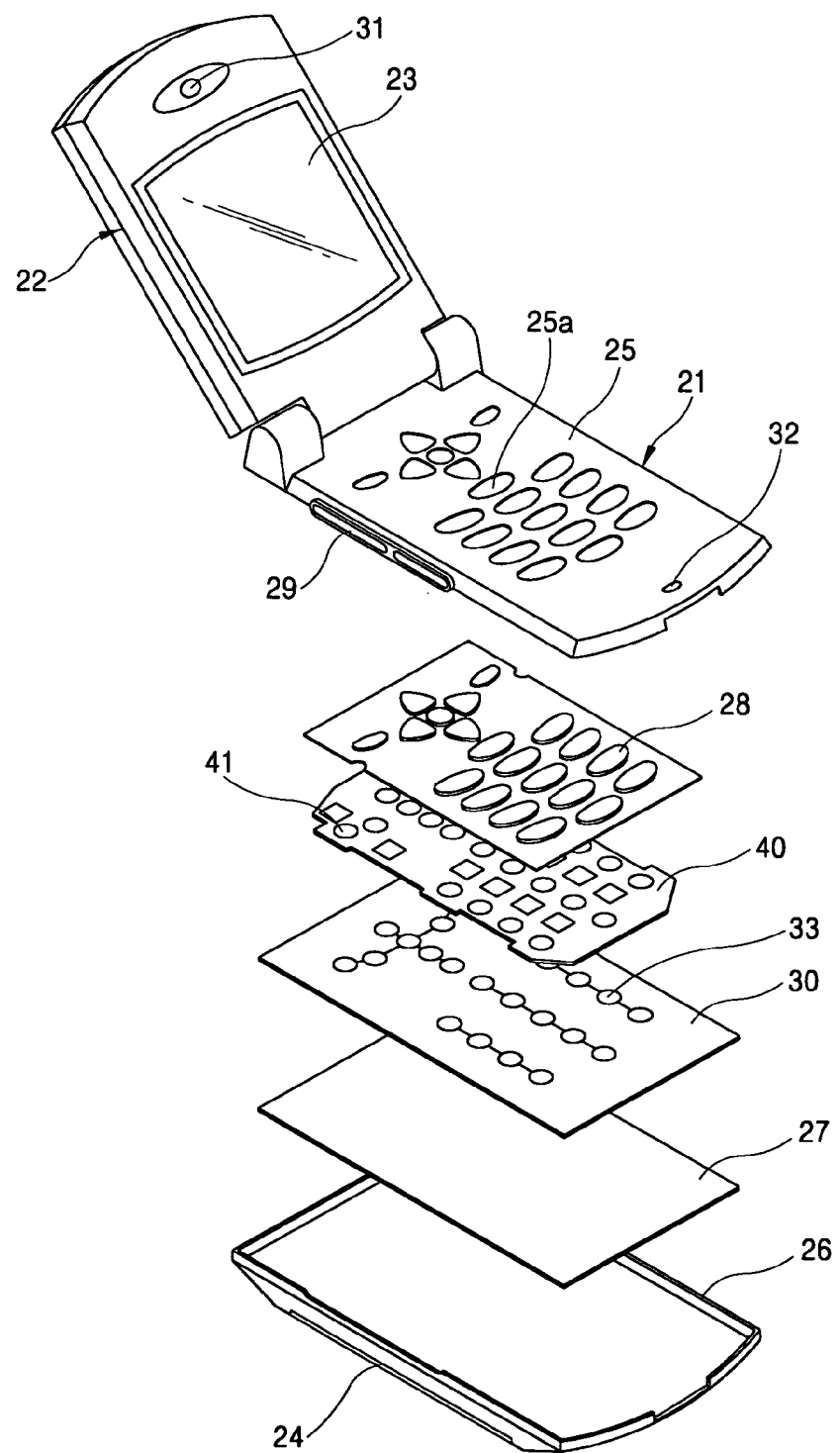
FIG. 2 is a disassembled perspective view of a mobile terminal in accordance with an example embodiment of the present invention.
Figure 3:
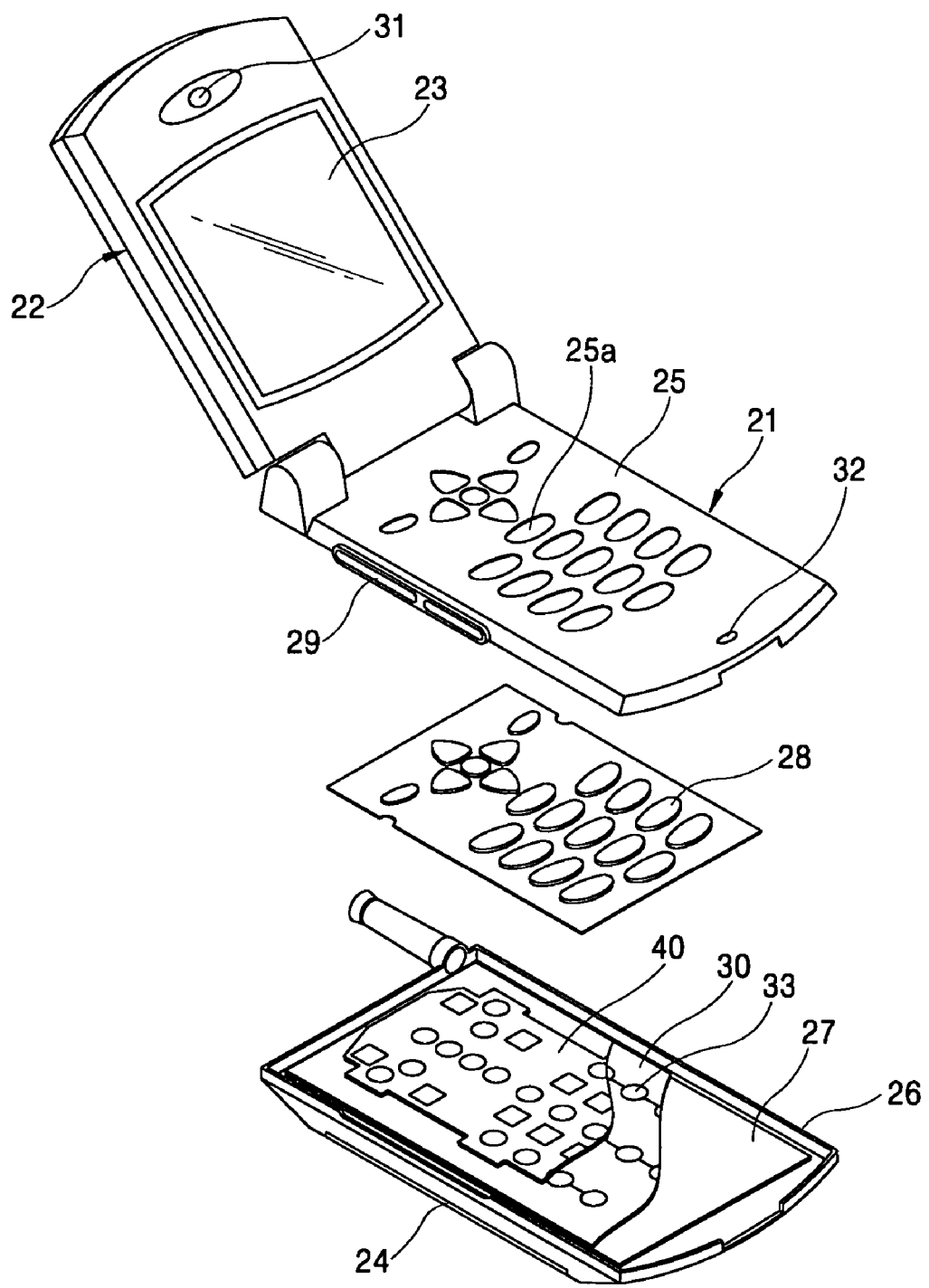
FIG. 3 is a perspective view showing a dome sheet and a copper plate attached in accordance with an example embodiment of the present invention.

FIG. 2 is a disassembled perspective view of a mobile terminal in accordance with an example embodiment of the present invention. FIG. 3 is a perspective view showing a dome sheet and a copper plate attached in accordance with the embodiment of FIG. 2. Other embodiments and configurations are also within the scope of the present invention.

As shown in FIG. 2, a mobile terminal may include a main body 21 and a folder 22 hinge-coupled to each other to be opened and closed. The folder 22 may include a display 23 for displaying text and other image information and a speaker unit 31 for outputting voice information such as a voice, a bell, music or the like.

The main body 21 may include a plurality of key pads 28 for receiving information from a user, a microphone unit 32 provided at the main body 21 for inputting voice information such as a voice, a bell, music or the like; a print circuit board 27 mounted in the main body 21; a battery 24 provided at the main body 21 for providing electric energy; a dome sheet 30 installed at an upper surface of the print circuit board 27 and having a plurality of domes 33 for transmitting information inputted by the user through a plurality of key pads 28 to the print circuit board 27. The main body 21 may also include a copper film 40 having through holes 41 through which domes 33 of the dome sheet 30 are exposed and for releasing heat generated from the print circuit board 27 to a wider area. Descriptions about the folder 22, the microphone unit 32 and the battery 24 will be omitted since they are well known to one skilled in the art.

The copper film 40 may include the through holes 41 at portions corresponding to dome 33 portions of the dome sheet 30 so that when a user inputs information through the key pads 28 there is no influence on click feeling, and a short-circuit does not occur with the domes 33 made of a metal material. In addition, the through holes 41 are provided at portions corresponding to where the protruded components are to be put on the print circuit board 27 so that the protruded components do not get interfered with during assembly.

The copper film 40 has a prescribed size so as to be formed to be a little larger than a component of the print circuit board 27 that generates a large amount of heat and may be positioned at a position corresponding to the component.

The copper film 40 may also be made of any one of gold, silver and aluminum having high heat conductivity or an alloy of any combination of them, either with or without copper.

Operation of the mobile terminal in accordance with an example embodiment of the present invention will now be described. Conduction of heat is inevitably generated from a print circuit board when a mobile phone is in operation. This conduction may be made by a key pad and an upper cover through a dome sheet. Since the dome portion of the dome sheet 30 is made of a metal material, and the remaining portions of the dome sheet 30 are made of a synthetic resin material (i.e., non-metal), heat conductivity may be low at the portions that are not made of a metal material. Accordingly, the heat cannot evenly spread but rather is concentrically transmitted to a specific area, thereby forming a hot area where a temperature of the key pad 28 and the upper cover is highest. By adding a copper film 40 having high heat conductivity, heat may be released to a wider area of the cooper film 40 in a process of transmitting heat to the key pad 28 from the dome sheet 30. Accordingly, the heat may be decreased and a temperature of the hot area may drop to be lower than when the copper film 40 is not used.

Figure 4:
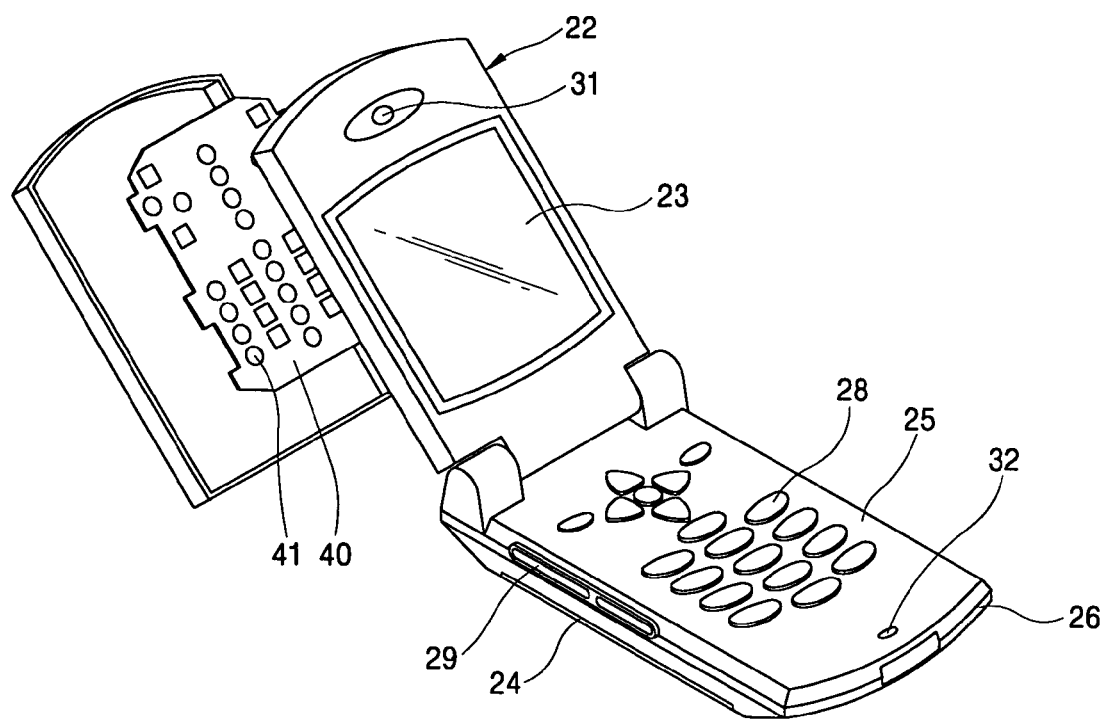
FIG. 4 is a disassembled perspective view of a mobile terminal in accordance with an example embodiment of the present invention.

FIG. 4 is a disassembled perspective view of a mobile terminal in accordance with an example embodiment of the present invention. Other embodiments and configurations are also within the scope of the present invention. As shown, the copper film 40 may be positioned at the folder 22 and have through holes 41 at positions in order to not interfere with positions of components positioned at the folder 22 and to prevent an electric short circuit. These components may include display components and/or components on a printed circuit board within the folder 22. Accordingly, heat generated from a component of the folder 22 may be distributed to a wider area to thereby decrease a temperature of a specific portion when the mobile phone is in operation.

Figure 5:
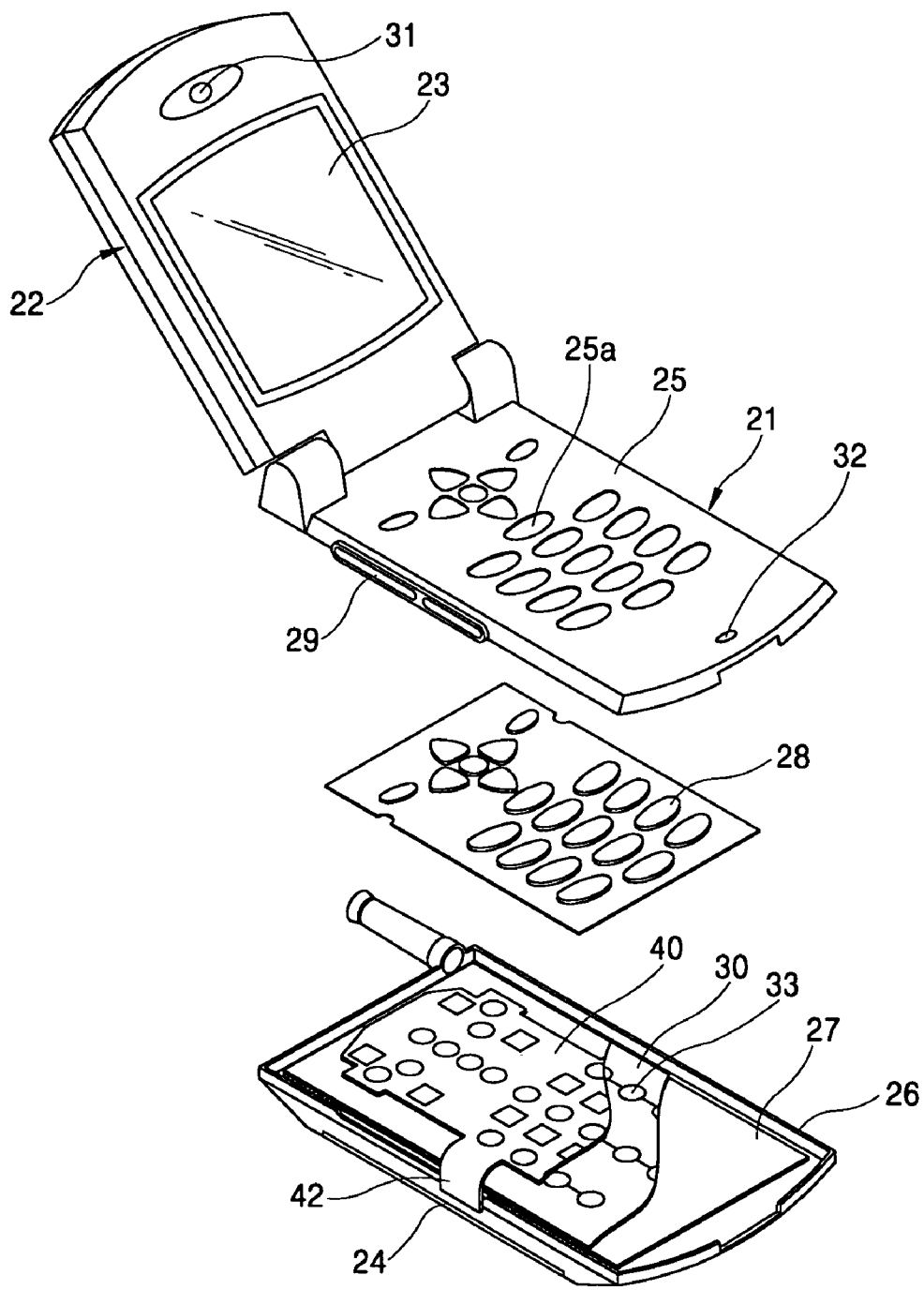
FIG. 5 is a perspective view showing that a dome sheet and a copper plate are attached in accordance with an example embodiment of the present invention.

FIG. 5 is a perspective view showing that a dome sheet and a copper film (or copper sheet) are attached in accordance with an example embodiment of the present invention. Other embodiments and configurations are also within the scope of the present invention. As shown in FIG. 5, a portion of the copper film 40 is extended so as to form a coupling unit 42. The coupling unit 42 may be coupled to an upper cover of the main body 21 or a lower cover 26. Accordingly, the copper film 40 may provide smooth heat conduction with the outside and thus may have a cooling effect so that a temperature of the hot area may decrease.

Figure 6:
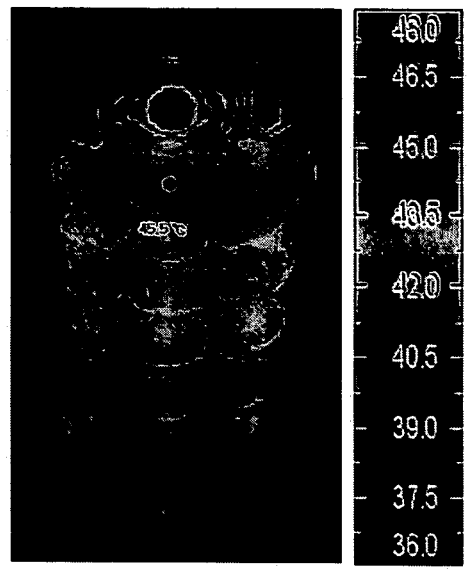
FIG. 6 is a picture showing a result of a heat generation characteristic test of a mobile terminal according to an example arrangement.
Figure 7:
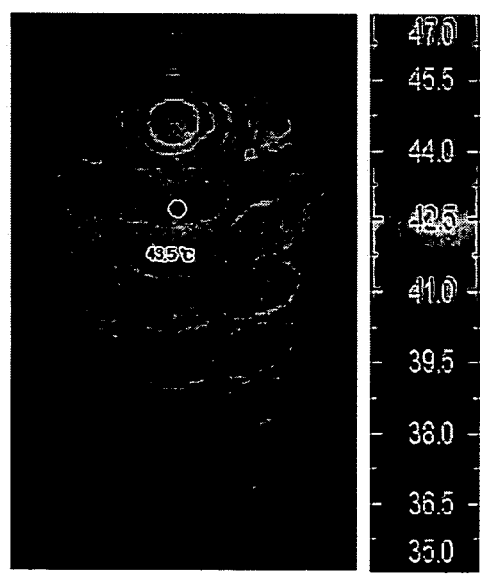
FIG. 7 is a picture showing a result of a heat generation characteristic test of a mobile terminal according to an example embodiment of the present invention.

FIG. 6 is a picture showing a result of a heat generation characteristic test of the mobile terminal according to one arrangement. FIG. 7 is a picture showing a result of a heat generation characteristic test of a mobile terminal according to an example embodiment of the present invention.

In the mobile terminal shown in FIG. 6, when a temperature around the key pad was measured at an ambient temperature of 28.5° C., and a maximum power of 23.80 dBm with an aging time of thirty minutes, then a highest temperature of a hot area was 45.5° C. On the contrary, in the mobile terminal shown in FIG. 7, when a temperature was measured with a copper film added to a dome sheet of the same material, a temperature of a hot area was 43.5° C., which improved over the mobile terminal results shown in FIG. 6 by about 2° C.

Since a dome portion is made of a metal material and the remaining portions of a dome sheet are made of a synthetic resin material (i.e., a non-metal material) in disadvantageous arrangements, the disadvantageous arrangements may have a problem that heat conductivity is low at the portions that are not made of a metal material. Accordingly, a key pad and an upper panel may increase in temperature thereby causing unpleasantness in view of use and performance deterioration of a component. However, embodiments of the present invention may be advantageous in that heat conductivity may be evenly distributed throughout and a temperature of a hot area in the key pad portion may drop, thereby relieving unpleasantness in view of use since a heat releasing member having good heat conductivity is provided to portions of the dome sheet that are not made of metal.

Embodiments of the present invention may be embodied in several forms without departing from the spirit or essential characteristics thereof. It should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A mobile terminal comprising:
a main body;
a plurality of key pads to receive information from a user;
a print circuit board;
a dome sheet having a plurality of domes mounted thereon, the dome sheet mounted on the print circuit board, the dome sheet having a lower heat conductivity than a heat conductivity of the plurality of domes, wherein each of the plurality of domes is formed of a metal material; and
a heat releasing member mounted on the dome sheet to release heat generated from the print circuit board, the heat releasing member provided between the plurality of key pads and the dome sheet, the dome sheet provided between the heat releasing member and the print circuit board, the heat releasing member being separate from the dome sheet and the plurality of domes, and wherein the heat releasing member includes a plurality of holes each corresponding to a different one of the domes, and each dome extending through a corresponding one of the holes of the heat releasing member, wherein the heat releasing member includes a coupling unit that extends to and is coupled to an outside of a cover of the main body or a folder of the mobile terminal, the coupling unit being exposed to the outside of the cover and to provide a heat conduction to the outside of the cover of the main body or the folder when the mobile terminal is in operation.

2. The mobile terminal of claim 1, wherein the heat releasing member comprises a thin film for distributively releasing heat generated from the print circuit board to a wider area.

3. The mobile terminal of claim 2, wherein the heat releasing member is installed at an upper surface of the dome sheet and is attached to an upper surface of the print circuit board for transmitting information inputted through a plurality of buttons by a user to the print circuit board.

4. The mobile terminal of claim 3, wherein the heat releasing member is attached to a portion of the dome sheet made of a non-metal material.

5. The mobile terminal of claim 1, wherein the heat releasing member is made of at least one of gold, silver, copper, or aluminum.

6. The mobile terminal of claim 1, further comprising the folder coupled to the main body.

7. The mobile terminal of claim 6, wherein the heat releasing member is positioned in the folder and releases heat generated from the folder to a wider area.

8. The mobile terminal of claim 1, wherein the heat releasing member has a prescribed size larger than a component of the print circuit board that generates a large amount of heat, and the heat releasing member is positioned at a position corresponding to the component.

9. The mobile terminal of claim 1, further comprising a battery, a display to display text, a speaker and a microphone unit.

10. The mobile terminal of claim 1, wherein the heat releasing member to evenly distribute heat from the print circuit board.

11. A mobile terminal comprising:
a main body;
a plurality of key pads;
a print circuit board mounted in the main body;
a dome sheet on a surface of the print circuit board, the dome sheet having a plurality of metal domes mounted thereon to transmit information input through the key pads to the print circuit board, the dome sheet having a first heat conductivity and the plurality of metal domes having a second heat conductivity higher than the first heat conductivity; and
a heat releasing metal film on the dome sheet such that the dome sheet is provided between the print circuit board and the heat releasing metal film and such that the heat releasing metal film is provided between the key pads and the dome sheet, the heat releasing metal film having a plurality of through holes through which the metal domes are exposed, the heat releasing metal film to release heat generated from the print circuit board, the heat releasing metal film being separate and different than the dome sheet and the plurality of metal domes, wherein the heat releasing metal film includes a coupling unit that extends to an outside of a cover of the main body or a folder of the mobile terminal and such that the coupling unit is exposed to the outside of the cover, and the coupling unit to provide a heat conduction to the outside of the main body or the folder.

12. The mobile terminal of claim 11, wherein the heat releasing metal film comprises a thin film for distributively releasing heat generated from the print circuit board.

13. The mobile terminal of claim 11, wherein the heat releasing metal film is installed at an upper surface of the dome sheet and is attached to an upper surface of the print circuit board.

14. The mobile terminal of claim 13, wherein the heat releasing metal film is attached to a portion of the dome sheet made of a non-metal material, the portion of the dome sheet having the first heat conductivity.

15. The mobile terminal of claim 11, wherein the heat releasing metal film comprises at least one of gold, silver, copper, or aluminum.

16. The mobile terminal of claim 11, further comprising the folder coupled to the main body.

17. The mobile terminal of claim 16, wherein the heat releasing metal film is positioned at the folder and releases heat generated from the folder.

18. The mobile terminal of claim 11, wherein the heat releasing metal film has a prescribed size larger than a component of the print circuit board that generates a large amount of heat and the heat releasing metal film is positioned at a position corresponding to the component.

19. The mobile terminal of claim 11, further comprising a battery, a display to display text, a speaker and a microphone unit.

20. The mobile terminal of claim 11, wherein the heat releasing metal film to evenly distribute heat from the print circuit board.

21. The mobile terminal of claim 11, wherein the coupling unit is exposed to the outside of the cover of the mobile terminal when the mobile terminal is in an opened position.

22. A handset comprising:
a handset body;
heat producing means for producing heat, the heat producing means being provided in the handset body;
a dome sheet having a plurality of domes mounted thereon, the dome sheet arranged on the heat producing means and having a heat conductivity lower than a heat conductivity of the plurality of metal domes; and
a heat dissipating metal film mounted on the dome sheet to dissipate the produced heat, the heat dissipating metal film including a plurality of holes corresponding to the plurality of metal domes, the dome sheet provided between the heat producing means and the heat dissipating metal film, the heat dissipating metal film being separate from the dome sheet and the plurality of domes, the dome sheet provided on a first side of the heat dissipating metal film and the metal dome extending through the holes of the heat dissipating metal film from the first side of the metal film to a second side of the metal film, wherein the heat dissipating metal film includes a coupling unit that extends to an outside of the handset body and the coupling unit being exposed to the outside of the handset body to provide a heat conduction to the outside of the handset.

23. The handset of claim 22, wherein the heat producing means comprises display components.

24. The handset of claim 22, wherein the heat producing means comprises a printed circuit board.

25. The handset of claim 24, wherein the heat dissipating metal film to evenly distribute heat from the printed circuit board.

26. The handset of claim 22, wherein the heat dissipating metal film is provided at an upper surface of the dome sheet.

27. The handset of claim 22, wherein the heat dissipating metal film is attached to a portion of the dome sheet made of a non-metal material.

28. The handset of claim 11, wherein the heat dissipating metal film is made of at least one gold, silver, copper, or aluminum.

29. The handset of claim 22, wherein the coupling unit is exposed to the outside of the handset body to provide the heat conduction to the outside of the handset when the handset is in operation.

* * * * *